United States Patent
Hauet et al.

(10) Patent No.: US 8,748,018 B2
(45) Date of Patent: Jun. 10, 2014

(54) PATTERNED PERPENDICULAR MAGNETIC RECORDING MEDIUM WITH DATA ISLANDS HAVING A FLUX CHANNELING LAYER BELOW THE RECORDING LAYER

(75) Inventors: Thomas Hauet, Nancy (FR); Olav Hellwig, San Jose, CA (US); Kentaro Takano, San Jose, CA (US)

(73) Assignee: HGST Netherlands B.V., Amsterdam (NL)

(*) Notice: Subject to any disclaimer, the term of this patent is extended or adjusted under 35 U.S.C. 154(b) by 541 days.

(21) Appl. No.: 12/577,344

(22) Filed: Oct. 12, 2009

(65) Prior Publication Data

US 2011/0085264 A1 Apr. 14, 2011

(51) Int. Cl.
*G11B 5/66* (2006.01)

(52) U.S. Cl.
USPC ........................................................ 428/828.1

(58) Field of Classification Search
None
See application file for complete search history.

(56) References Cited

U.S. PATENT DOCUMENTS

| | | | |
|---|---|---|---|
| 6,947,235 B2 * | 9/2005 | Albrecht et al. ................ | 360/55 |
| 7,097,924 B2 | 8/2006 | Haginoya et al. | |
| 7,422,808 B2 | 9/2008 | Sugimoto et al. | |
| 2007/0065955 A1* | 3/2007 | Maeda et al. ...................... | 438/3 |
| 2007/0243418 A1* | 10/2007 | Fullerton et al. ............... | 428/828 |
| 2007/0292720 A1* | 12/2007 | Suess .......................... | 428/828.1 |
| 2008/0112079 A1* | 5/2008 | Fullerton et al. .......... | 360/123.02 |
| 2009/0004509 A1 | 1/2009 | Benakli et al. | |
| 2010/0247960 A1* | 9/2010 | Qiu et al. ...................... | 428/800 |

FOREIGN PATENT DOCUMENTS

JP  2009026394  2/2009

* cited by examiner

*Primary Examiner* — Holly Rickman
*Assistant Examiner* — Linda Chau
(74) *Attorney, Agent, or Firm* — Thomas R. Berthold (57) ABSTRACT

A patterned perpendicular magnetic recording medium, such as a disk for use in hard disk drives, has a flux channeling layer (FCL) located below the recording layer (RL) in each of the discrete data islands. The disk includes a substrate, a soft underlayer (SUL) of soft magnetically permeable material on the substrate, and a nonmagnetic exchange break layer (EBL) on the SUL. A nonmagnetic separation layer (SL) is located between the FCL and the RL in the islands. The FCL has an anisotropy field substantially lower than the anisotropy field of the RL, and a magnetization equal to or higher than the magnetization of the RL. The FCL is saturated at a much lower field than the RL and thus channels the magnetic flux from the write head through the island positions. The dipolar fields from the RL above the FCL polarize the magnetization of the FCL parallel to the magnetization direction of the RL in the absence of an external field, to thereby enhance the readback signal.

11 Claims, 10 Drawing Sheets

PATTERNED PERPENDICULAR MAGNETIC RECORDING MEDIUM WITH DATA ISLANDS HAVING A FLUX CHANNELING LAYER BELOW THE RECORDING LAYER

BACKGROUND OF THE INVENTION

1. Field of the Invention

This invention relates generally to patterned perpendicular magnetic recording media, such as disks for use in magnetic recording hard disk drives, and more particularly to patterned disks with data islands having improved magnetic recording properties.

2. Description of the Related Art

Magnetic recording hard disk drives with patterned magnetic recording media have been proposed to increase data density. In conventional continuous magnetic recording media, the magnetic recording layer is a continuous layer over the entire surface of the disk. In patterned media, also called bit-patterned-media (BPM), the magnetic recording layer on the disk is patterned into small isolated data islands arranged in concentric data tracks. Patterned-media disks may be longitudinal magnetic recording disks, wherein the magnetization directions are parallel to or in the plane of the recording layer, or perpendicular magnetic recording disks, wherein the magnetization directions are perpendicular to or out-of-the-plane of the recording layer. Perpendicular media will likely be the choice for patterned media because of the increased data density potential of perpendicular media. To produce magnetic isolation of the patterned data islands, the magnetization of the spaces between the islands is destroyed or substantially reduced to render these spaces essentially nonmagnetic. Alternatively, the media may be fabricated so that that there is no magnetic material in the spaces between the islands.

In one type of patterned media, the data islands are elevated, spaced-apart pillars that extend above the disk substrate surface to define troughs or trenches on the substrate surface between the pillars. This type of patterned media is of interest because substrates with the pre-etched pattern of pillars and trenches can be produced with relatively low-cost, high volume processes such as lithography and nanoimprinting. The magnetic recording layer material is then deposited over the entire surface of the pre-etched substrate to cover both the ends of the pillars and the trenches. The trenches may be recessed far enough from the read/write head so as to not adversely affect reading or writing, or the magnetic material in the trenches may be rendered essentially nonmagnetic during fabrication. This type of patterned media is described by Moritz et al., "Patterned Media Made From Pre-Etched Wafers: A Promising Route Toward Ultrahigh-Density Magnetic Recording", *IEEE Transactions on Magnetics*, Vol. 38, No. 4, July 2002, pp. 1731-1736.

One problem associated with patterned perpendicular media is the relatively wide variation in the coercive field ($H_c$) among the individual magnetic islands, sometimes also called "dots". This variation is characterized by a wide distribution of the switching field, i.e., the write field required to switch the magnetization of a magnetic island from one state to the other state. Ideally the switching field distribution (SFD) width would be zero, meaning that all the bits would switch at the same write field strength. A high-width SFD decreases the bit-addressability because the likelihood of the write field switching the magnetization of dots adjacent to the dot being addressed is increased. Additionally, it has been found that the SFD broadens (that is, the bit-to-bit variation in the coercive field increases) as the size of the magnetic islands is reduced, which limits the achievable density of patterned perpendicular media. The SFD in arrays of dots with perpendicular magnetic anisotropy has been explained by a distribution of intrinsic anisotropy by Thomson et al., "Intrinsic Distribution of Magnetic Anisotropy in Thin Films Probed by Patterned Nanostructures", *Phys. Rev. Lett.* 96, 257204 (2006).

An additional problem arises in patterned perpendicular media because of the ultra-high density of the dots. In conventional continuous perpendicular media, the linear density (along-the-track density of the dots) is typically 4 to 6 times the track density (the density of the tracks in the radial or cross-track direction), while in patterned media the linear density and track density will be about the same. This is because any suitable patterned media fabrication process will only be utilized to its full potential if along-the-track and cross-track dot spacings are similar in size. Thus, much higher track densities are anticipated for patterned perpendicular media. However, due to the high write field and limited head field gradients achievable there may be fringing fields from the write head leaking into adjacent dots in adjacent tracks. This can cause inadvertent switching of the magnetization (overwriting) of adjacent dots. Also, as the linear density increases, fringing fields from the write head may also cause inadvertent switching of adjacent dots in the same track as the dot being addressed. This problem is exacerbated because the fringing fields acting on adjacent dots encompass relatively large angles with the perpendicular easy-axis of the recording layer on the dots, which increases the likelihood of overwriting.

There is also a need in patterned perpendicular media for a higher readback signal from the individual dots and thus a higher signal-to-noise ratio (SNR) in the readback signal.

What is needed is a patterned perpendicular magnetic recording medium that has increased readback signal from the dots and improved bit-addressability during writing so as to be less susceptible to overwriting of adjacent dots.

SUMMARY OF THE INVENTION

The invention relates to a patterned perpendicular magnetic recording medium, such as a patterned perpendicular magnetic recording disk for use in hard disk drives, that has a flux channeling layer (FCL) located below the recording layer (RL) in each of the discrete data islands. The disk includes a substrate, a soft underlayer (SUL) of soft magnetically permeable material on the substrate, and a nonmagnetic exchange break layer (EBL) on the SUL that breaks the magnetic exchange between the SUL and the FCL in the islands. A nonmagnetic separation layer (SL) is located between the FCL and the RL in the islands to prevent magnetic coupling between the RL and the FCL.

The FCL is formed of a soft magnetic material that has an anisotropy field substantially lower than the anisotropy field of the RL, and a magnetization equal or higher than the magnetization of the RL. The FCL has an anisotropy field low enough to assure that the FCL is saturated at a much lower field than the RL and thus can channel the magnetic flux from the write head through the island positions to thus effectively lower the external field necessary to reverse the island being written to. Also, the FCL has an anisotropy field low enough to assure that the dipolar fields from the RL above it are able to align the magnetization of the FCL parallel to the magnetization direction of the RL in the absence of an external field, to thereby enhance the readback signal from the read head.

For a fuller understanding of the nature and advantages of the present invention, reference should be made to the following detailed description taken together with the accompanying figures.

DETAILED DESCRIPTION OF THE INVENTION

Figure 1:
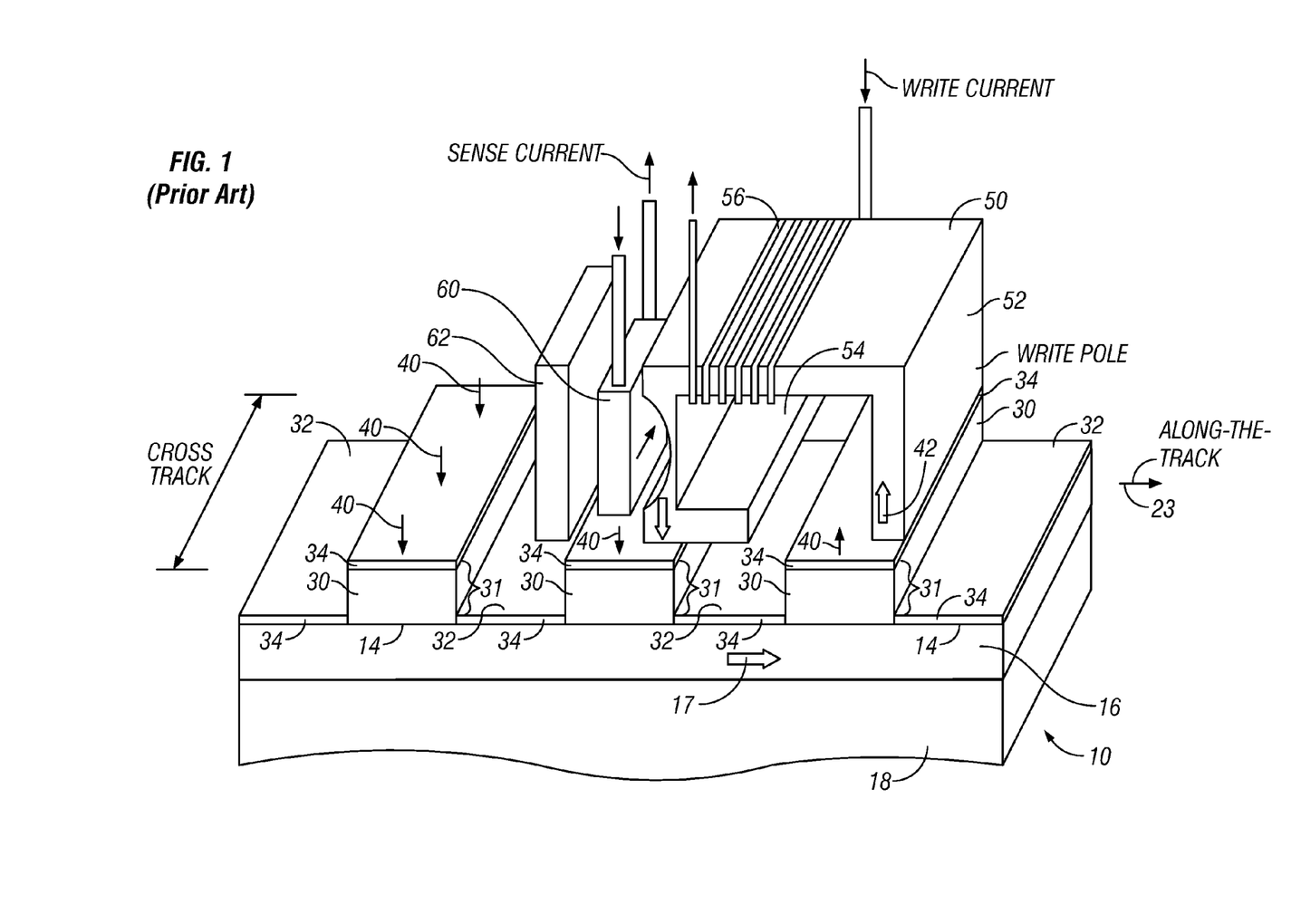
FIG. 1 is a schematic representation of a perpendicular magnetic recording system with a prior art patterned perpendicular medium.

FIG. 1 is a schematic representation of a prior art perpendicular magnetic recording system with patterned perpendicular media. The system can be implemented in a magnetic recording disk drive, with the medium being a magnetic recording disk with the patterned bits arranged into concentric circular data tracks. FIG. 1 thus shows a portion of a disk 10 that includes a substrate 18 with a "soft" or relatively low-coercivity magnetically permeable underlayer (SUL) 16 having a relatively planar surface 14. A plurality of discrete patterned pillars 30 extend generally perpendicularly from the surface 14. The pillars 30 are spaced apart, leaving troughs or trenches 32 recessed below the ends of the pillars 30. The pillars 30 support a layer 34 of perpendicular magnetic recording material. The recording layer 34 is formed on the ends of the pillars 30 as well as on surface 14 in the trenches 32. The recording layer 34 on each of the pillars 30 is magnetized perpendicularly, as depicted by arrows 40, resulting in the recorded bits being stored in the recording layer 34 in a generally perpendicular or out-of-plane orientation (i.e., other than parallel to the surface of the recording layer 34). The pillars 30 with recording layer 34 are discrete magnetic islands 31 that function as the patterned bits.

In this type of patterned media, even though there is magnetic recording layer material in the trenches 32, the perpendicular spacing between the trenches 32 and the ends of the pillars 30 is the basis for isolating the recorded bits. Only the perpendicular magnetic recording layer 34 on the ends of the pillars 30 contributes to the readback signal, with each island 31 representing one bit. The magnetic recording layer material that is located in the trenches 32 does not significantly contribute to the readback signal and thus does not adversely affect the readback signal. It is also possible that the trenches 32 may contain no magnetic material, or that the magnetic material in the trenches 32 is rendered substantially nonmagnetic so as to not generate any magnetic field. For example, in application Ser. No. 11/558,846 filed Nov. 10, 2006 and assigned to the same assignee as this application, a layer of amorphous silicon (Si) may be located in the trenches and the disk annealed to cause the Si to diffuse into the magnetic trench material and render it nonmagnetic.

An exchange break layer (EBL) (not shown) is typically located between the magnetically permeable SUL 16 and the recording layer 34 to break the magnetic exchange coupling between the recording layer 34 and the SUL 16. Also shown in FIG. 1 is the read head 60 and the write head 50 (with write pole 52 and a return pole 54). Write current passes through a coil 56 of the write head 50 to generate a magnetic field (arrow 42) at the write pole 52. This magnetic field magnetizes the recording layer 34 on the pillar 30 beneath the write pole in the direction 40. The SUL 16 serves as a flux return path (arrow 17) for the magnetic field between the write pole 52 and the return pole 54 of the write head 50. The detection or reading of the recorded bits is by a read head 60, typically a magnetoresistive (MR) read head, such as a tunneling MR (TMR) read head in which a sense current passes perpendicularly through the layers making up the head. A shield 62 of magnetically permeable material may be used to prevent magnetizations from bits other than the bit being read from reaching the read head 60.

Figure 2:
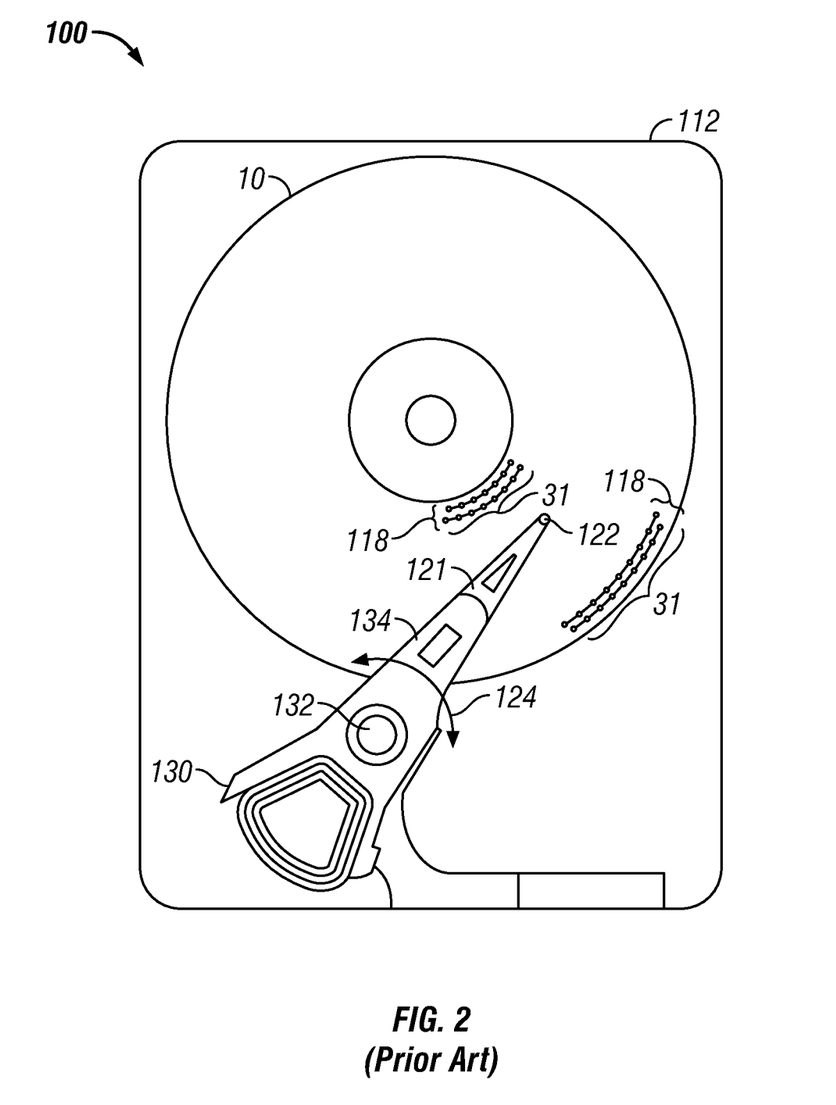
FIG. 2 is a top view of a disk drive implementation of the system illustrated in FIG. 1 and shows the patterned bits arranged in concentric circular data tracks.

FIG. 2 is a top view of a disk drive implementation of the system illustrated in FIG. 1. The drive 100 has a housing or base 112 that supports an actuator 130 and a drive motor for rotating the magnetic recording disk 10. The actuator 130 may be a voice coil motor (VCM) rotary actuator that has a rigid arm 134 and rotates about pivot 132 as shown by arrow 124. A head-suspension assembly includes a suspension 121 that has one end attached to the end of actuator arm 134 and a head carrier 122, such as an air-bearing slider, attached to the other end of suspension 121. The suspension 121 permits the head carrier 122 to be maintained very close to the surface of disk 10. The read head 60 (FIG. 1) and write head 50 (FIG. 1) are typically formed as an integrated read/write head (not shown) patterned on the trailing surface of the head carrier 122. The islands 31 on disk 10 are arranged in radially-spaced concentric circular data tracks 118. As the disk 10 rotates, the movement of actuator 130 allows the read/write head on the trailing end of head carrier 122 to access different data tracks 118 on disk 10. The writing on patterned media requires the synchronization of the write pulses with the pattern of pillars. A patterned media magnetic recording system that uses the magnetized pillars to clock the writing is described in U.S. Pat. No. 6,754,017 assigned to the same assignee as this application.

Figure 3:
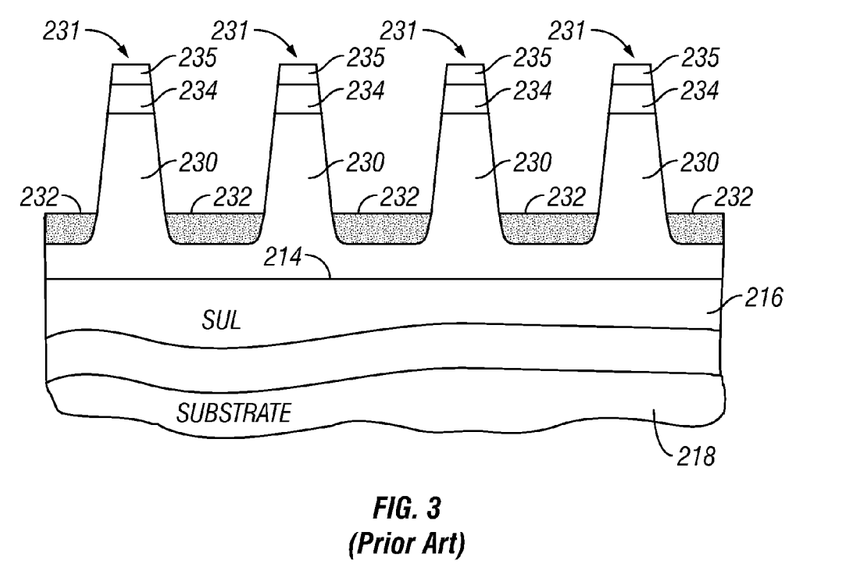
FIG. 3 is a sectional view of one type of prior art patterned perpendicular magnetic recording disk showing the magnetic islands in the form of pillars and nonmagnetic regions in the form of trenches recessed from the tops of the pillars.

FIG. 3 is a sectional view of one type of prior-art patterned perpendicular magnetic recording disk showing the discrete magnetic islands 231 and nonmagnetic regions in the form of trenches 232 recessed from the pillars 230. The substrate 218 supports a continuous non-patterned SUL 216. The SUL 216 may be a single layer formed of magnetically permeable materials, such as alloys of CoNiFe, FeCoB, CoCuFe, NiFe, FeAlSi, FeTaN, FeN, FeTaC, CoTaZr, CoFeTaZr, CoFeB, and CoZrNb, or a laminated structure formed of multiple soft magnetic films separated by nonmagnetic films, such as electrically conductive films like Al and CoCr or antiferromagnetic coupling films like Ru and Ir. The substrate 218 may be any commercially available glass disk blank, but may also be a conventional aluminum alloy with a NiP surface coating, or an alternative disk blank, such as silicon, canasite or silicon-carbide. An optional adhesion layer (not shown) for the growth of the SUL, such as an AlTi alloy, may be formed on base 218 before deposition of the SUL 216. Pillars 230, which may be formed of Ta, diamond-like carbon (DLC), Mo, SiN or $SiO_2$, extend from the surface 214 of SUL 216. A layer 234 of magnetic recording material having perpendicular magnetic anisotropy is formed on the tops of pillars 230 and a protective overcoat 235, such as a conventional amorphous 'diamond-like' carbon, is formed on top of the recording layer 234. The layer 234 of recording material and the overcoat 235 are deposited over the entire surface to cover the trenches 232 and the tops of pillars 230. The pillars 230 are formed of nonmagnetic material, such as SiN or $SiO_2$, and thus serve as the EBL between the recording layer 234 and the SUL 216. The trenches 232 are recessed far enough from the read/write head so the magnetic material in the trenches does not adversely affect reading or writing to the recording layer 234 n the tops of the pillars 230. The magnetic material in the trenches 232 may also be rendered essentially nonmagnetic during fabrication, such as by "poisoning" it with Si or Ge.

The substrate 218 with SUL 216 and pillars 230 may be formed by any well-known technique for forming pre-etched substrates, such as conventional lithography, direct-write electron-beam (e-beam) lithography, and nanoimprinting. For example, a layer of Ta, DLC, Mo, SiN or $SiO_2$ may be deposited or formed over the entire surface 214 of SUL 216 to a thickness generally corresponding to the desired height for the pillars 230. This layer is then etched down to leave the Ta, DLC, Mo, SiN or $SiO_2$ pillars 230 and a portion of the Ta, DLC, Mo, SiN or $SiO_2$ in the trenches 232, as shown in FIG. 3.

In a nanoimprinting process, a master template is fabricated, typically by direct e-beam writing, to have the desired pattern. After a layer of the material to form pillars 230, e.g., $SiO_2$, is formed on surface 214, a thin film of imprint resist (i.e., a thermal plastic polymer) is spin coated onto the $SiO_2$ layer. Then the master template with its predefined pattern is brought into contact with the imprint resist film and the template and substrate are pressed together and heat is applied. When the resist polymer is heated above its glass transition temperature, the pattern on the template is pressed into the resist film. After cooling, the master is separated from the substrate and the patterned resist is left on the $SiO_2$ layer. Reactive-ion-etching (RIE) can be used to transfer the pattern in the resist to the underlying $SiO_2$ layer to form the $SiO_2$ pillars 230 and the $SiO_2$ in the trenches 232 between the pillars 230.

In a direct-write e-beam patterning process, after the layer of the material to form pillars 230, e.g., $SiO_2$, is formed over the entire surface 214, a thin resist layer, such as poly-methylmethacrylate (PMMA), can be deposited on the $SiO_2$ layer. The resist layer is then patterned with an e-beam tool. After this resist layer is developed, a pattern of holes is left in the resist layer. A thin chromium (Cr) layer can then be deposited into the holes and onto the patterned resist layer. In the following lift-off process, the remaining resist together with the Cr on top of it is removed, leaving a pattern of Cr dots. This pattern is transferred onto the $SiO_2$/Si by reactive ion etching (RIE) using the Cr dots as a hard mask. The optional etch-stop layer would facilitate the termination of the RIE. After the desired trench depth (i.e., the height of the pillars) is achieved, the Cr layer is removed and the substrate cleaned. The above-described nanoimprinting and direct-write e-beam patterning processes are well known and described in further detail in numerous references, including G. Hu, et al., "Magnetic and recording properties of Co/Pd islands on prepatterned substrates", *J. Appl. Phys.*, Vol. 95, No. 11, Part 2, 1 Jun. 2004, pp. 7013-7015.

Figure 4:
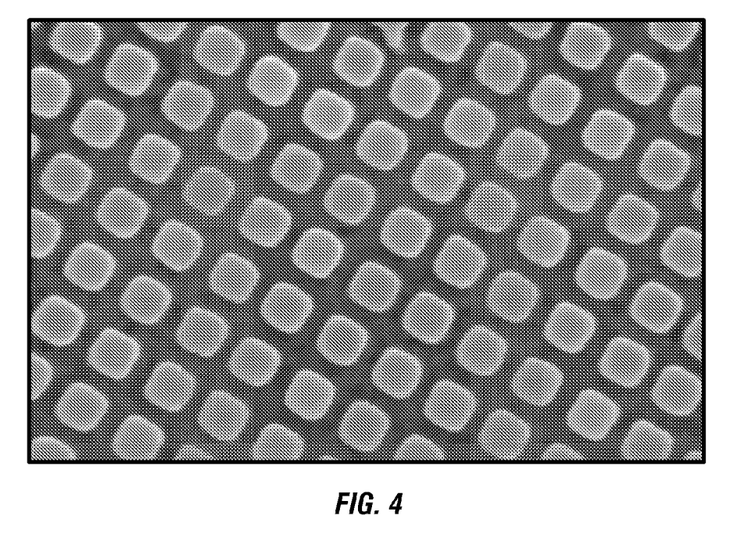
FIG. 4 is a scanning electron microscope (SEM) image showing a top view of an actual structure similar to that depicted schematically in FIG. 3.

FIG. 4 is a scanning electron microscope (SEM) image showing a top view of an actual structure similar to that depicted schematically in FIG. 3. The magnetic islands or dots are 40 nm high SiN pillars on a Si wafer with 50 nm island length and width on a 100 nm pitch (i.e., the spacing between the centers of the pillars is 100 nm). FIG. 4 shows the dots spaced in an arrangement where the ratio of linear density (bits-per-inch in the along-the-track direction) to track density (tracks-pre-inch in the radial or cross-track direction) is about 1:1. However, this is but one illustrative example and is not meant to be a limitation on the dot spacing arrangement on an actual disk. For example, if the islands have a width and length of about 20 nm and the island-to-island spacing in both the radial and along-the-track direction is about 35 nm, then these dimensions would result in areal bit density of about 500 Gbit/$in^2$. To achieve patterned-media disks with both an ultra-high areal bit density (at least 1 Terabits/$in^2$), smaller islands with a track pitch of 50 nm and an island pitch of about 12.5 nm will be required.

Figure 5:
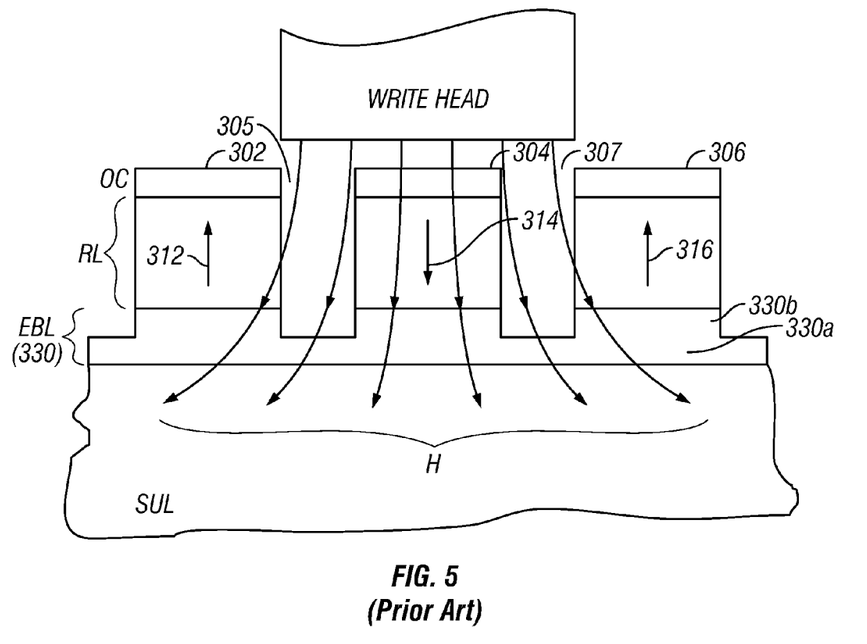
FIG. 5 is a schematic of the write process on prior art patterned perpendicular media.

FIG. 5 is a schematic of the write process on patterned perpendicular media. The media structure includes a substrate with three adjacent discrete magnetic islands 302, 304, 306 located in adjacent tracks, and two nonmagnetic regions 305, 307 separating the magnetic islands. The magnetic islands are located on pillar portions 330b of an exchange break layer (EBL) 330 that also includes a base portion 330a. Each magnetic island is shown with a recording layer (RL) and a protective overcoat (OC). Each magnetic island is magnetized in one of two perpendicular directions, as shown by arrows 312, 314, 316 in the RLs of islands 302, 304, 306, respectively. The write head is shown above magnetic island 304 and applying a write field H to the RL in island 304. During the write process, the write head applies a sufficiently large magnetic field H to allow for a switching of the magnetization (arrow 314) in island 304. However, due to the high write field and limited head field gradients achievable this may also result in the write field H leaking out into adjacent magnetic islands 302, 306, which may be located in the same data track as island 304 or in adjacent data tracks. These stray or fringing fields in adjacent islands can cause overwriting (erasure) of adjacent magnetic islands. This problem is exacerbated because the fringing fields onto adjacent islands encompass large angles with the perpendicular easy-axis of the RLs, as indicated by the angle between write field H and the magnetization of island 302 (arrow 312), which increases the likelihood of overwriting adjacent islands.

Figure 6:
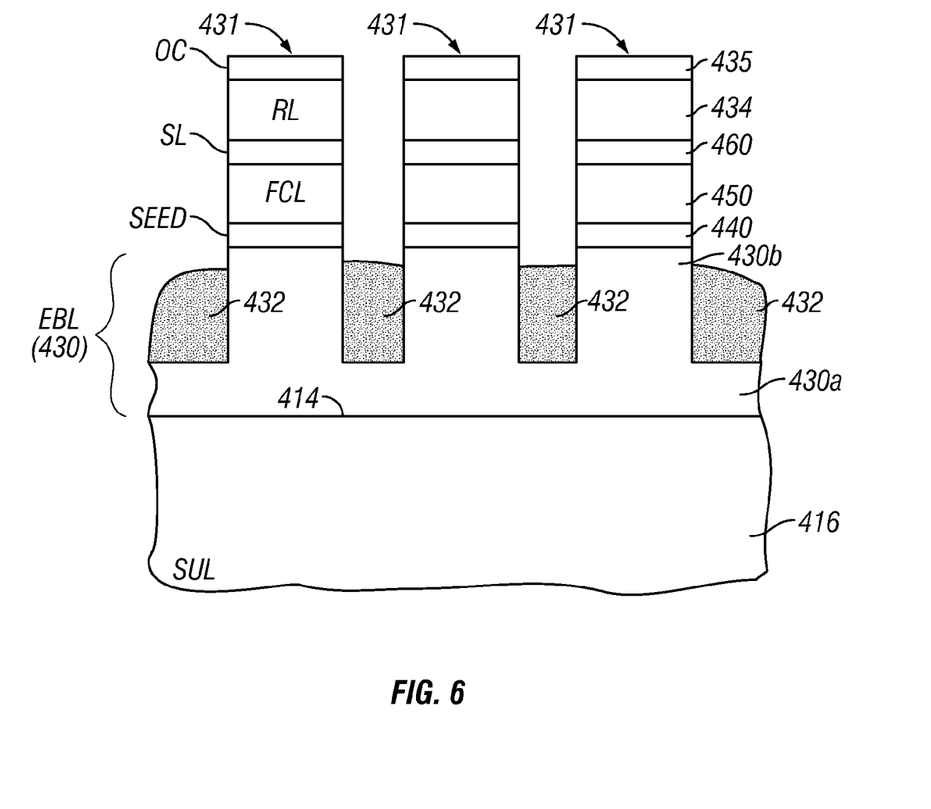
FIG. 6 is a sectional view of the patterned perpendicular magnetic recording disk according to this invention, fabricated from a prepatterned substrate, and showing discrete magnetic islands and trenches.

FIG. 6 is a sectional view of the patterned perpendicular magnetic recording disk according to this invention, fabricated from a prepatterned substrate, and showing discrete magnetic islands 431 and trenches 432. The SUL 416 has a generally planar surface 414 for the EBL 430. The EBL 430 has two portions, a lower base portion 430a and upper pillar portions, like typical pillar portion 430b. Each island 431 includes a soft magnetically permeable flux channeling layer (FCL) 450 located between the EBL (pillar 430b) and the perpendicular magnetic recording layer (RL) 434. An overcoat (OC) 435 is on the RL 434. An optional seed layer 440 may be deposited on the tops of pillars 430b prior to the deposition of the FCL 450. A nonmagnetic spacer layer (SL) 460 is located between the FCL 450 and the RL 434 and magnetically decouples the FCL and the RL. The EBL 430 prevents magnetic exchange coupling between the FCL 450 and the SUL 416. In the embodiment shown in FIG. 6, the disk is fabricated, for example using the above-described nanoimprinting method, from a prepatterned substrate. The prepatterned substrate comprises the hard disk substrate (not shown), the SUL 416 and the EBL 430 with pillars 430b above base 430a. The layers 440, 450, 460, 434 and 435 are then sequentially deposited, typically by sputtering, over the entire surface of the prepatterned substrate. This forms the discrete magnetic islands 431, and also fills the trenches 432. However, the material in the trenches is typically a mixture of the materials on the tops of pillars 430b and/or an incomplete deposition of these materials as a result of shadowing by the pillars 430b during the deposition process. For this reason, and because the trenches are substantially below the RL, any magnetic material in the trenches 432 does not significantly affect reading and writing of the RL in the magnetic data islands 431.

A representative disk structure for the invention shown in FIG. 6 will now be described. The hard disk substrate (not shown) may be any commercially available glass substrate, but may also be a conventional aluminum alloy with a NiP surface coating, or an alternative substrate, such as silicon, canasite or silicon-carbide.

The SUL 416 may be formed of magnetically permeable materials such as alloys of CoNiFe, FeCoB, CoCuFe, NiFe, FeAlSi, FeTaN, FeN, FeTaC, CoTaZr, CoFeTaZr, CoFeB, and CoZrNb. The SUL 416 is a continuous non-patterned layer formed on the disk substrate and having a generally planar surface 414. The SUL 416 may also be a laminated or multilayered SUL formed of multiple soft magnetic films separated by nonmagnetic films, such as electrically conductive films of Al or CoCr. The SUL 416 may also be a laminated or multilayered SUL formed of multiple soft magnetic films separated by interlayer films that mediate an antiferromagnetic coupling, such as Ru, Ir, or Cr or alloys thereof. An optional adhesion layer (OL) (not shown) for the growth of the SUL, such as an AlTi alloy or a similar material, may be located on the disk substrate before the formation of the SUL.

The EBL 430 is located on top of the SUL 416. It acts to break the magnetic exchange coupling between the magnetically permeable films of the SUL 416 and the FCL 450. The EBL 430 can be a nonmagnetic titanium (Ti) or tantalum (Ta) layer; a non-electrically-conducting material such as Si, Ge and SiGe alloys; a metal such as Cr, Ru, W, Zr, Nb, Mo, V and Al; a metal alloy such as amorphous TaCr, CrTi and NiP; an amorphous carbon such as $CN_x$, $CH_x$ and C; or oxides, nitrides or carbides of an element selected from the group consisting of Si, Al, Zr, Ti, and B, or $SiO_2$. The total thickness of the EBL 430 is between about 10-30 nm and the thickness of the base portion 430a is between about 5-10 nm. An optional seed layer (not shown) may be deposited on surface 414 of SUL 416 before deposition of the EBL 430. For example, if a TaCr alloy is used as the EBL 430, a 1-5 nm thick layer of SiN or Ta may be used as the seed layer.

The seed layer 440 on the tops of pillars 430b facilitates the growth of the FCL 450. The seed layer 440 may be selected from Ta, Cr, Au or Cu and deposited to a thickness in the range of about 1 to 5 nm.

The FCL 450 may be formed from a soft magnetically permeable material, like permalloy ($Ni_{80}Fe_{20}$), that has a relatively low anisotropy field, i.e., substantially lower than the anisotropy field of the RL 434. The effective anisotropy field $H_{k,eff}$ of a ferromagnetic layer with uniaxial magnetic anisotropy energy $K_u$ is the magnetic field that would need to be applied to align the magnetization along the hard anisotropy axis. For the FCL 450 an effective anisotropy field $H_{k,eff}$ of less than 5 kOe is desirable. The FCL 450 may have a thickness in the range of about 2 to 10 nm. The easy axis of the FCL is preferably out-of-plane, but even in-plane anisotropy or tilted anisotropy systems with any angle in between out-of-plane and in-plane is acceptable if the anisotropy field is low enough. The FCL has an anisotropy field low enough to assure that the FCL is saturated at a much lower field than the RL (the island with the lowest reversal field in the array of islands) and thus can channel the magnetic flux from the write head through the island positions, rather than through the trenches, to thus effectively lower the external field necessary to reverse the island being written to. Also, the FCL 450 has an anisotropy field low enough to assure that the dipolar fields from the RL 434 above it are able to align the magnetization of the FCL 450 parallel to the magnetization direction of the RL 434 in the absence of an external field, to thereby enhance the readback signal.

For currently used RLs in perpendicular magnetic recording, which have an effective anisotropy field ($H_{k,eff}$) in the range of about 10 to 20 kOe, the effective anisotropy field ($H_{k,eff}$) of the FCL should be substantially lower, preferably no greater than 50 percent of the effective anisotropy field of the RL. Thus, if the effective anisotropy field of the RL is 10 kOe, the effective anisotropy field of the FCL should be below 5 kOe, preferably below 1 kOe. However, for higher areal densities and smaller islands RLs with higher anisotropy fields will be needed to ensure thermal stability. In that case the effective anisotropy field ($H_{k,eff}$) of the FCL may increase as well. The FCL material preferably has a high magnetization, for example greater than about 500 emu/cm$^3$, preferably equal to or higher than the magnetization of the RL material. Thus, besides permalloy, other materials like Co, Fe, Ni, and CoFe, NiFe and CoNi alloys may function as the FCL material.

The RL 434 is preferably a multilayer with perpendicular magnetic anisotropy, like a Co/Ni, Co/Pt, Co/Pd, Fe/Pt or Fe/Pd multilayer. However, the recording layer material can also be one of the well-known chemically-ordered binary alloys CoPt, CoPd, FePt, FePd, $CoPt_3$, $Co_3Pt$, $CoPd_3$ and $Co_3Pd$ or pseudo-binary alloys based on the CoPt and FePt $L1_0$ phase. Chemically-ordered alloys of CoPt, CoCrPt, CoPd, FePt and FePd (all ordered in $L1_0$ or $L1_1$) and $CoPt_3$, $Co_3Pt$ and $CoPd_3$ (all ordered in $L1_2$) in their bulk form, are known for their high magneto-crystalline anisotropy and magnetization, properties that are desirable for high-density magnetic recording materials. Pseudo-binary alloys based on the CoPt $L1_1$ and FePt $L1_0$ phase, e.g., $(Co_{(y)}Pt_{(100-y)})$—X and $(Fe_{(y)}Pt_{(100-y)})$—X, where y is between about 45 and 55 atomic percent and the element X may be Ni, Au, Cu, Pd or Ag and is present in the range of between about 0% to about 20% atomic percent, are also suitable high anisotropy materials. While the pseudo-binary alloys in general have similarly high anisotropy as the binary alloys FePt and CoPt, they allow additional control over the magnetic and structural properties of the media.

The nonmagnetic spacer layer (SL) 460 between the FCL 450 and the RL 434 is a nonmagnetic layer for preventing magnetic exchange coupling between the FCL and the RL and may also act as a seed layer for the RL. Suitable materials for the SL 460 include Ta, Cr, Au, Cu, Si, Pd, Pt and a RuCr alloy like $Ru_{90}Cr_{10}$, with a thickness between about 2 to 10 nm. If the RL 434 is formed of a multilayer with perpendicular magnetic anisotropy, such as a Co/Pt, Co/Pd, Fe/Pt, Fe/Pd or Co/Ni multilayer, then the SL may comprise a Ta layer or Si/Au bilayer with a layer of Pt or Pd on top, i.e., a Si/Au/Pt or Si/Au/Pd trilayer, or Ta/Pt or Ta/Pd bilayer. This Si/Au/Pt or Si/Au/Pd trilayer or Ta/Pt or Ta/Pd bilayer also functions as a seed layer to enhance the growth of the RL multilayer. As one specific example, the SL may be a bilayer of Ta(15 Å)/Pd(30 Å) and the RL may be a multilayer of 8 pairs of Co(2.8 Å)/Pd(9 Å).

The OC 435 formed on top of the RL 434 may be an amorphous "diamond-like" carbon (DLC) film or another known protective overcoat, such as Si-nitride, BN or B4C.

Figure 7A:
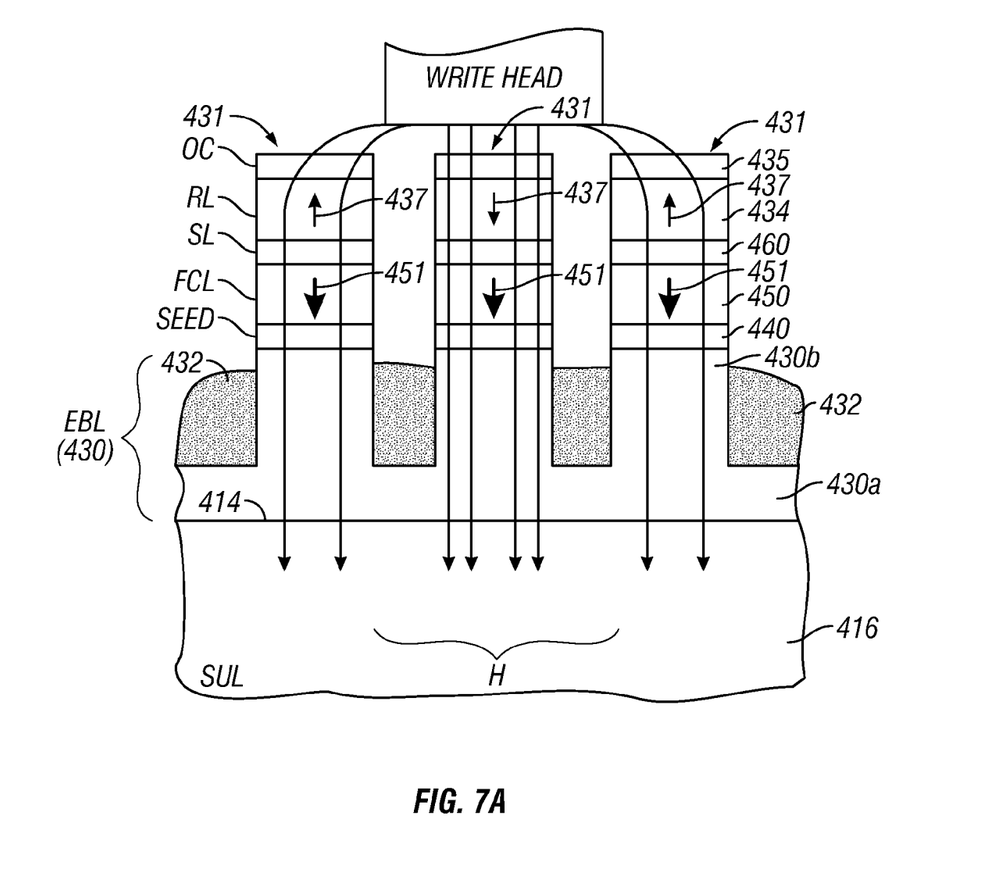
FIG. 7A is a schematic showing the improved write process for the patterned perpendicular magnetic recording medium with the flux channeling layer (FCL) according to this invention.
Figure 7B:
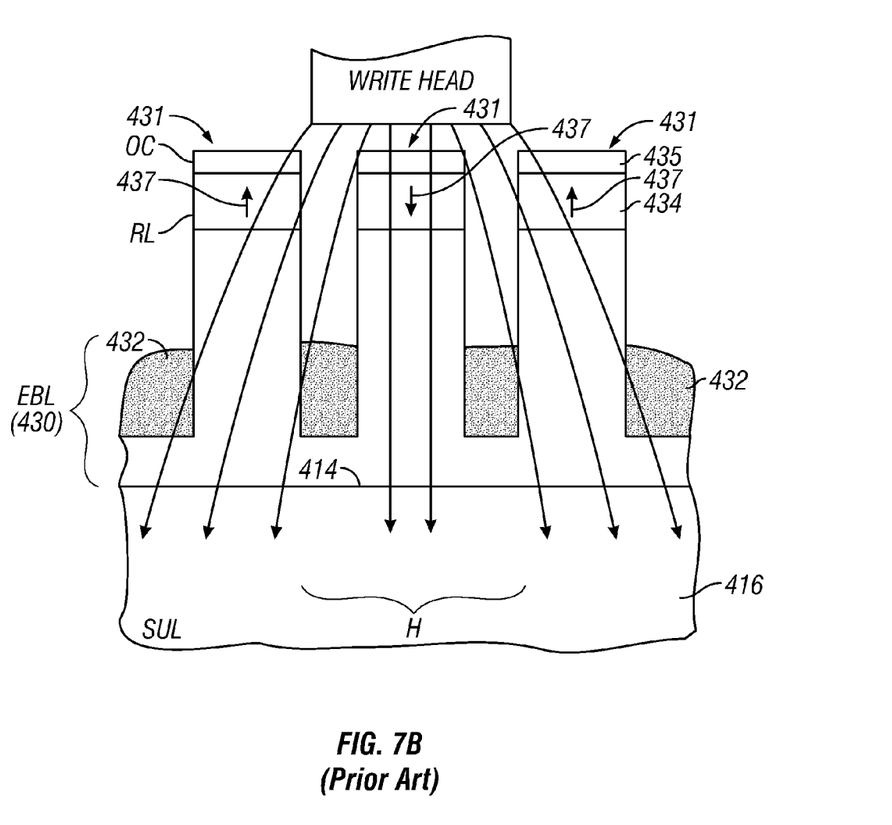
FIG. 7B is a schematic showing the write process for a prior art patterned perpendicular magnetic recording medium without the FCL.

The advantage of the medium of this invention during writing is depicted schematically in FIG. 7A, which shows the write head above one of the magnetic islands 431. The FCL 450, which is magnetically isolated from the RL 434 above it and the SUL 416 below it, focuses the write field H and thus both increases the write field onto the RL 434 and decreases the write field in the trenches 432. In the presence of the write field H, the RL 434 has its magnetization 437 switched and the FCL 450 is magnetized in the direction 451 parallel to the external field in the island 431 directly below the write head (the island being addressed). This decreases the likelihood of inadvertently switching the magnetization 437 in the RLs of the magnetic islands 431 adjacent to the island directly below the write head. The arrows 451 in the FCL 450 are depicted as being thicker than the arrows 437 in the RL 434 because the FCL is made of a material with a higher magnetization than the material of the RL. For example, a Co FCL has a magnetization of about 1400 emu/$cm^3$, while a Co/Pt, Co/Pd, Fe/Pt or Fe/Pd multilayer RL has a magnetization in the range of about 300 to 1000 emu/$cm^3$. FIG. 7A can be compared with FIG. 7B, which shows the effect of the write field H on islands 431 that do not have a FCL below the RL. FIG. 7B shows that without the FCL, the flux lines make a much larger angle with respect to the magnetization 437 in the islands adjacent to the island being addressed. This makes inadvertent overwriting of these adjacent islands much more likely than when the flux lines are more parallel to the easy axis of magnetization 437 (here normal to the island surface) in the adjacent islands, as depicted in FIG. 7A. Even though the FCL may increase the magnetic flux through the adjacent islands (perhaps up to about 5-10%) it also changes the angle of the field though the adjacent islands and makes the field lines progress more straight through the adjacent islands, as can be seen by comparing FIG. 7A to FIG. 7B. However based on a Stoner-Wohlfarth like uniform island reversal it has been estimated that, for example, if the angle of the field through the adjacent islands is reduced from 30 to 15 degrees to the surface normal by introducing an FCL, then this results in a 25-30% higher field necessary to reverse the magnetization of the RL in the adjacent islands.

Figure 8A:
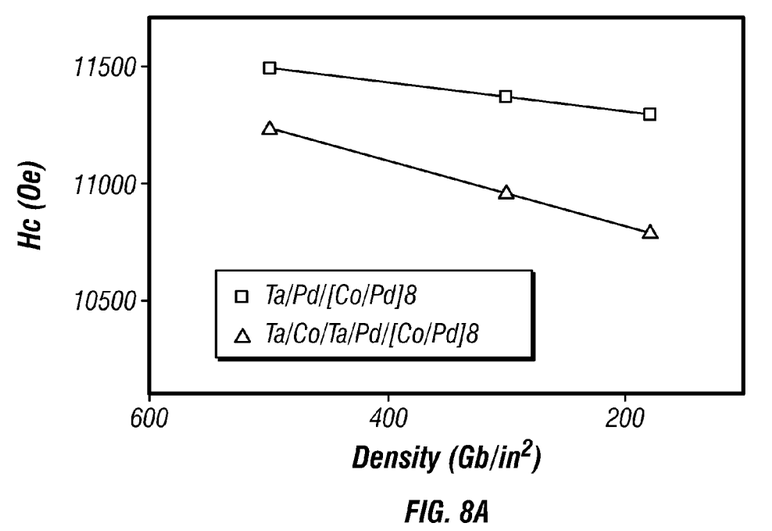
FIG. 8A is a comparison of measured coercive field ($H_c$) as a function of areal bit density for a first simple model system of a multilayered RL with and without a FCL.

FIG. 8A is a comparison of measured coercive field ($H_c$) as a function of areal bit density for a model system consisting of a multilayered RL with and without a FCL. The RL was a multilayer of 8 pairs of Co(2.8 Å)/Pd(9 Å) formed on a seed layer of a bilayer of Ta(15 Å)/Pd(30 Å). The data points represented by squares are for just the RL with the bilayer seed layer. The data points represented by triangles are the RL with bilayer seed layer, but with a FCL below the seed layer. For these test structures the FCL is pure Co with a thickness of 25 Å, and the Ta(15 Å)/Pd(30 Å) bilayer functions as the spacer layer (SL) between the FCL and the RL. The measured lower $H_c$ for the RL with the FCL means that there is a higher write field and write field gradient at the islands being addressed by the write head as a result of the channeling of flux from the write head by the FCL. This improves bit-addressability and thus decreases the likelihood of switching the magnetization of bits adjacent to the bit being addressed.

Figure 8B:
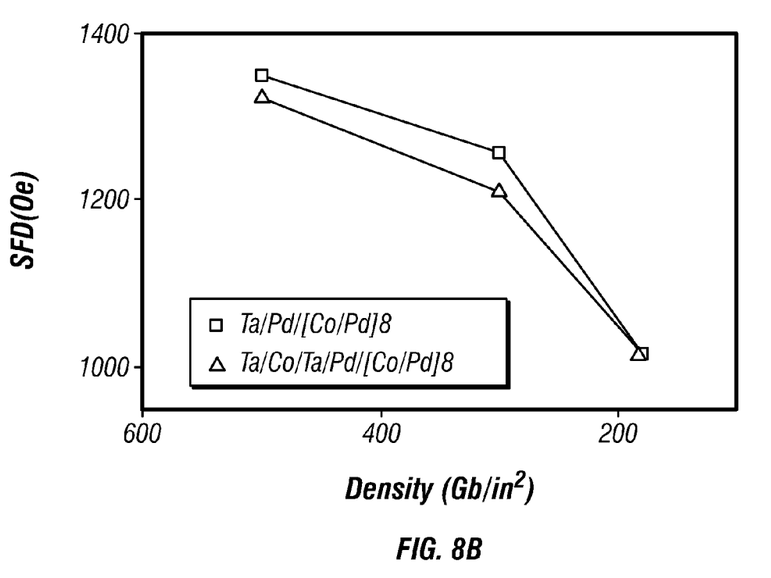
FIG. 8B is a comparison of measured switching field distribution (SFD), in terms of absolute value (Oe), as a function of areal bit density for a multilayered RL with and without a FCL.

FIG. 8B is a comparison of measured switching field distribution (SFD), in terms of absolute value (in Oe), for the two example structures of FIG. 8A. FIG. 8B thus shows that for the higher values of data density of interest (greater than 300 Gbits/$in^2$), there is less variation in switching fields among the individual dots, which indicates better bit-addressability for the RL with FCL. This is likely due to the fact that the FCL directs the flux more parallel to the magnetization in the islands adjacent to the island being addressed, making them less likely to be overwritten.

Figure 9:
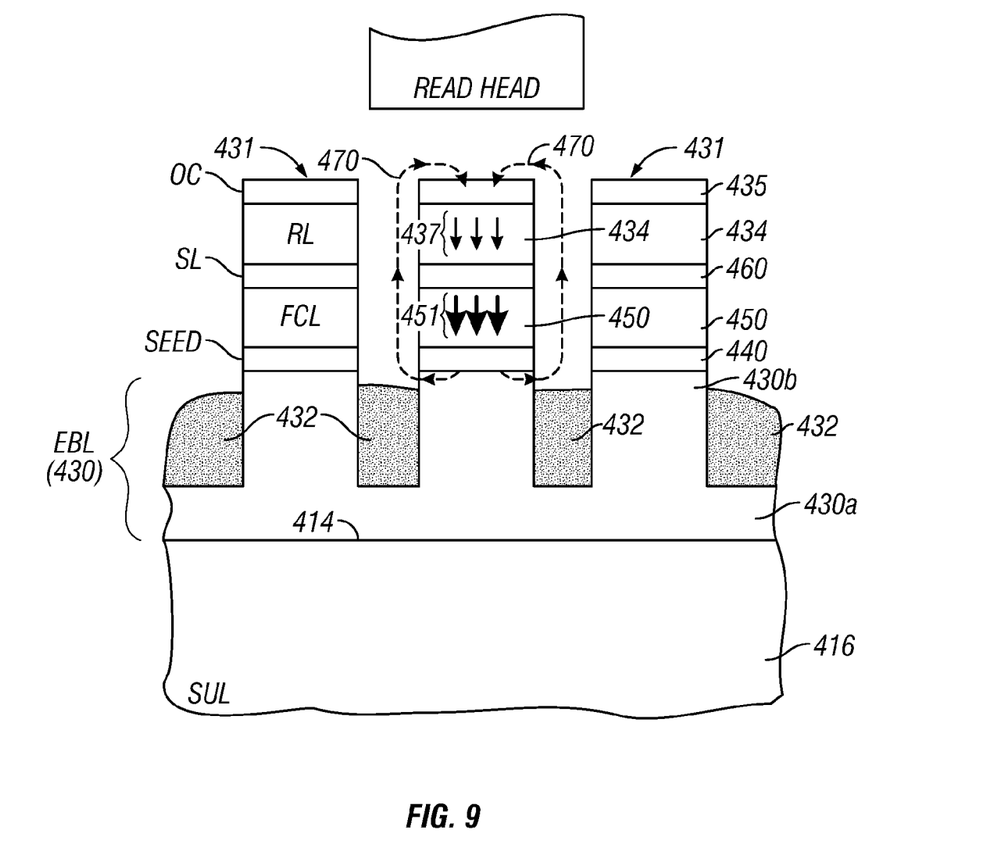
FIG. 9 is a schematic showing the improved read process for the patterned perpendicular magnetic recording medium according to this invention.

The advantage of the medium of this invention during reading is depicted schematically in FIG. 9, which shows the read head above one of the magnetic islands. The FCL 450, which is magnetically isolated from the RL 434 above it and the SUL 416 below it, is exposed to the dipolar magnetic field 470 from the magnetization 437 of the previously recorded RL 434. This additional flux from the FCL 450 enhances the readback signal from the RL 434 and thus increases the signal-to-noise ratio (SNR) during readback of the recorded data.

Figure 10:
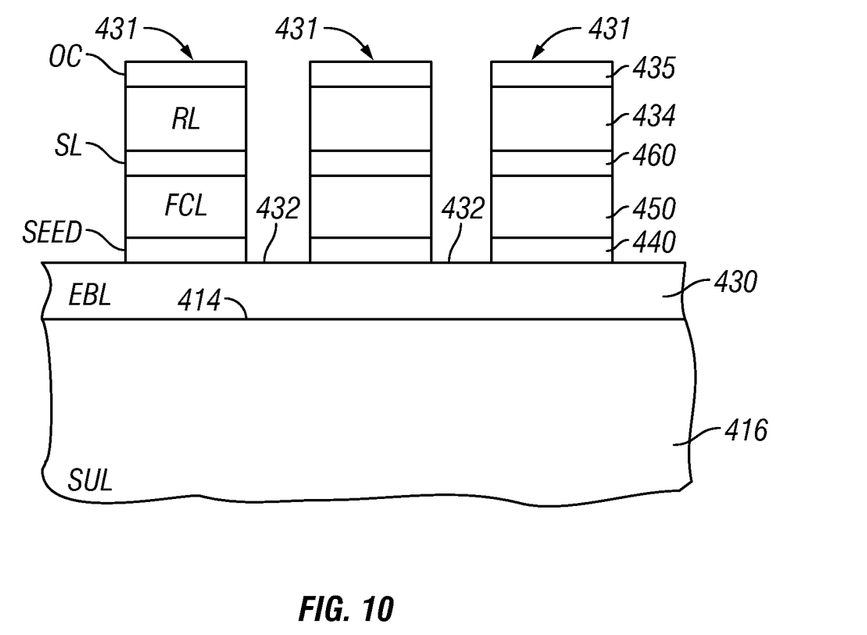
FIG. 10 is a sectional view of the patterned perpendicular magnetic recording disk according to this invention, fabricated by etching an initially full film structure into islands and trenches rather than using pre-patterned substrates.

FIG. 10 is a sectional view of the patterned perpendicular magnetic recording disk according to this invention, fabricated by an etching process. The disk of FIG. 10 is substantially similar to the disk of FIG. 6 except that there are no pillars formed of EBL material and no material in the trenches 432. The SUL 416 is formed on the hard disk substrate (not shown) and has a generally planar surface 414. All of the layers 430, 440, 450, 460, 434 and 435 are then sequentially deposited, typically by sputtering, over the entire surface 414. Then the structure is lithographically patterned and etched, such as by ion milling or reactive ion etching (RIE), down to the upper surface of EBL 430. This leaves the discrete magnetic islands 431 separated by trenches 432 that contain none of the material of the layers making up the islands 431. The etching may be performed to also remove a portion of the EBL in the trenches 432 to make sure all of the seed layer 440 is removed.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A patterned perpendicular magnetic recording medium comprising:
    a substrate having a substantially planar surface;
    a soft underlayer (SUL) of soft magnetically permeable material on the substrate surface and having a planar surface;
    an exchange break layer (EBL) of nonmagnetic material comprising a base layer of EBL material covering the entire planar surface of the SUL and a plurality of pillars of EBL material extending from the base layer of EBL material; and
    a plurality of discrete islands, each island located on a pillar of EBL material and comprising a flux channeling layer (FCL) on the EBL material of the pillar and prevented from exchange coupling with the SUL by the EBL material, a perpendicular magnetic recording layer (RL), and a nonmagnetic separation layer (SL) on the FCL between the FCL and the RL for preventing magnetic exchange coupling between the FCL and the RL, the FCL formed of a soft magnetic material having an anisotropy field lower than the anisotropy field of the RL and a magnetization higher than the magnetization of the material of the RL, the RL and FCL having parallel magnetizations perpendicular to the substrate surface.

2. The medium of claim 1 wherein the FCL comprises a material selected from Co, Fe, Ni, and an alloy comprising two or more of Co, Fe and Ni.

3. The medium of claim 1 wherein the EBL is formed of a material selected from the group consisting of Si, Ge, SiGe alloys, Ta, Cr, Ru, W, Zr, Nb, Mo, V, Al, CrTi, NiP, CNx, CHx, C, and oxides, nitrides and carbides of an element selected from the group consisting of Si, Al, Zr, Ti, and B.

4. The medium of claim 1 wherein the SUL is formed of a material selected from the group consisting of alloys of CoFe, CoNiFe, NiFe, FeCoB, CoCuFe, FeAlSi, FeTaN, FeN, FeTaC, CoTaZr and CoZrNb.

5. The medium of claim 1 wherein the SUL is a lamination of multiple magnetically permeable films separated by nonmagnetic films.

6. The medium of claim 5 wherein the nonmagnetic films in the lamination provide antiferromagnetic coupling of the magnetically permeable films in the lamination.

7. The medium of claim 1 wherein the SL is formed of a material selected from Ta, Cr, Au, Cu, Si, Pd, Pt and a RuCr alloy.

8. The medium of claim 1 wherein the RL is selected from a chemically-ordered alloy selected from alloys of FePt, CoPt, FePd, CoPd, $CoPt_3$ and $CoPd_3$; a chemically-ordered $L1_0$ or $L1_1$ phase alloy selected from FePt—X and CoPt—X, where the element X is selected from the group consisting of Ni, Au, Cu, Pd and Ag; and a multilayer selected from the group consisting of Co/Pt, Co/Pd, Co/Ni, Fe/Pt and Fe/Pd multilayers.

9. The medium of claim 1 wherein the RL is a multilayer selected from the group consisting of Co/Pt, Co/Pd, Co/Ni, Fe/Pt and Fe/Pd multilayers.

10. The medium of claim 9 wherein the SL is selected from a Ta/Pd bilayer, a Ta/Pt bilayer, a Si/Au/Pd trilayer and a Si/Au/Pt trilayer.

11. A magnetic recording disk drive comprising:
a magnetic recording disk comprising:
  a substrate having a substantially planar surface;
  a soft underlayer (SUL) of soft magnetically permeable material on the substrate surface and having a planar surface;
  an exchange break layer (EBL) of nonmagnetic material comprising a base layer of EBL material covering the entire planar surface of the SUL and a plurality of pillars of EBL material extending from the base layer of EBL material; and
  a plurality of discrete islands, each island located on a pillar of EBL material and comprising a flux channeling layer (FCL) on the EBL material of the pillar and prevented from exchange coupling with the SUL by the EBL material, a perpendicular magnetic recording layer (RL), and a nonmagnetic separation layer (SL) on the FCL between the FCL and the RL for preventing magnetic exchange coupling between the FCL and the RL, the FCL formed of a soft magnetic material having an anisotropy field lower than the anisotropy field of the RL and a magnetization higher than the magnetization of the material of the RL, the RL and FCL having parallel magnetizations perpendicular to the substrate surface;
a write head for switching the magnetization of the RL in the data islands; and
a read head for reading the magnetized RL in the data islands.

* * * * *